United States Patent [19]
Yokoo

[11] Patent Number: 4,720,724
[45] Date of Patent: Jan. 19, 1988

[54] METHOD AND APPARATUS FOR AUTOMATIC RANGE FINDING

[75] Inventor: Hirokazu Yokoo, Tokyo, Japan

[73] Assignee: Fuji Photo Film Co., Ltd., Kanagawa, Japan

[21] Appl. No.: 67,281

[22] Filed: Jun. 29, 1987

[30] Foreign Application Priority Data

Jun. 27, 1986 [JP] Japan ................................ 61-151216

[51] Int. Cl.⁴ ................................................ G03B 3/00
[52] U.S. Cl. .................................................... 354/403
[58] Field of Search .......................................... 354/403

[56] References Cited

U.S. PATENT DOCUMENTS 3,936,187 2/1976 Momose ............................... 354/403
4,464,038 8/1984 Nanba ................................... 354/403
4,591,257 5/1986 Sawano ................................ 354/403

*Primary Examiner*—Russell E. Adams
*Attorney, Agent, or Firm*—Young & Thompson

[57] ABSTRACT

An automatic range finding method and apparatus for a camera of the type which projects a line of light toward a scene including a subject to be photographed. Light reflected from the subject is received by a light sensor having a plurality of photoelectric conversion pixels arranged in a matrix. The photoelectric conversion pixels receiving the reflected light are detected, and the subject distance is determined according to a pixel line which contains one of the detected photoelectric conversion pixels nearest to the first pixel line.

5 Claims, 9 Drawing Figures

METHOD AND APPARATUS FOR AUTOMATIC RANGE FINDING

BACKGROUND OF THE INVENTION

The present invention relates to a method and apparatus for automatic range finding which is used for an automatic focussing camera.

Almost all recent compact cameras are provided with means for determining automatically the distance from the subject to be photographed to the camera and for adjusting the focus of the camera lens according to that determination. The means for determining the subject distance sights as a target a small area at the center of the field of view of the camera lens. A target mark indicates that small central area in the viewfinder. The target mark must be aligned with the subject which is intended to be photographed in order to determine automatically accurately the subject distance of the intended subject. For an actual subject distance determination, after aiming the target mark at the intended subject to be photographed, an operating member, which is usually a shutter release member, is depressed halfway so as to actuate the subject distance determining means. If the shutter release member is further depressed, the adjustment of the focus of the camera lens is effected in accordance with that determined subject distance and then the shutter is actuated.

Conventional compact cameras provided with the automatic subject distance determining means described above require aiming the target at the subject intended to be photographed. For this reason, if the subject on which the camera lens is to be focussed is eccentric of the view field of the camera finder, it is necessary to orient the camera so as to direct the target mark to the intended subject in order to effect the desired subject distance determination prior to framing. Then, to effect framing after the subject distance determination, it is necessary to reorient the camera while keeping the shutter release member depressed halfway.

Because of this difficult subject distance determination, the conventional compact cameras are neither quick nor easy to use. In order to remedy this, there has been proposed a compact camera which has means for automatically determining the subject distance by sighting as a target a wide area of the field of view of the camera lens, that is, without the provision of a target mark in the camera finder. This subject distance determining means with no target mark (which is hereinafter referred to as a target-free subject distance determining device) is disclosed in Japanese Patent Appln. No. 60-87,894 having the same assignee as this application. The target-free subject distance determining device comprises light projecting means for emitting a transverse line of illumination light toward a subject and light detecting means comprising a large number of small photoelectric conversion elements (which are hereinafter referred to as pixels) arranged in m lines×n columns for detecting the light reflected from the subject. In the target-free subject distance determination device, the determination of subject distance is made according to a pixel line comprised of pixels receiving the reflected light.

Although the above-described target-free subject distance determining device obviates the necessity of reorienting the camera after a subject distance determination, there remains the problem of double-subject detection due to the use of a line of illumination light. Specifically, if there are two subjects at different distances in the field of view of the camera lens, the reflected light from those subjects is detected by at least two pixels in different pixel lines. The target-free subject distance determining device cannot decide which one is detecting the subject actually intended to be photographed. For avoiding such confusion from double-subject detection, the target-free subject distance determining device is adapted to adjust the focus of the camera lens to the nearer subject. Therefore, if a subject which is intended to be photographed is in fact farther from the camera than the other subject in the field of view of the camera lens, the camera lens will not focus on the intended subject.

For example, when the intended subject is at a distance less than, say, four meters, which is the limit of a predetermined short photographic distance range, and the subject is approximately at the center of image field, but farther from the camera than another subject off to the side of the intended subject, the camera lens is adjusted to that other subject, with the result that the intended subject image is out of focus and loses sharpness. This loss of sharpness of the intended subject can be ignored when both subjects are beyond the short photographic distance range, namely, in a long photographic distance range wherein ordinary camera lenses are sufficiently focussed on subjects at any in-range distances. But the loss of sharpness becomes too great to ignore within the short distance photographic range.

OBJECT OF THE PRESENT INVENTION

It is, therefore, an object of the present invention to provide a method and apparatus for automatically determining the subject distance of an intended subject even though another subject exists in the short photographic distance range of the photographic field.

SUMMARY OF THE INVENTION

The present invention is based upon the fact that, in short-distance picture taking, the intended subject is ordinarily sighted at the center of the scene to be photographed. According to the present invention, the technique of determining the subject distance comprises projecting a line of illumination light toward a scene including a subject to be photographed; receiving reflected light from the subject by a light sensor having a plurality of photographic conversion pixels arranged in m pixel lines and n pixel columns (wherein m and n are positive integers), of which the first pixel line of the plurality of photoelectric conversion pixels receives light reflected from the subject at the shortest subject distance and the m-th pixel line of the plurality of photoelectric conversion pixels receives light reflected from the subject at the longest subject distance. Those photoelectric conversion pixels are detected which receive the reflected light. The subject distance is determined according to where a portion of the reflected light is received. A short distance center pixel range comprises photoelectric conversion pixels between the first to I-th (I=m) pixel liens in at least one pixel column including the middle pixel column. A pixel line which includes one of the detecting photoelectric conversion pixels in the short distance center pixel range is given priority over other pixel lines to each of which belongs any one of the remainder of the photoelectric conversion pixels. When no portion to the reflected light is received by the short distance center pixel range, the one of the other pixel lines nearest to the first pixel lines determines the range. A signal is provided by which the camera lens is adjusted to the determined subject distance.

According to a feature of the present invention, the field of view of the camera lens is notionally divided into two ranges: a short distance center field range and an outer field range. When a subject stands in each field range, the camera lens is focussed on the subject in the short distance center field range in preference to the subject in the outer field range. Therefore, in short distance shooting, the camera lens is sure to be focussed on the subject intended to be photographed even though there are a plurality of subjects in the short distance range of the field of view.

DETAILED DESCRIPTION OF THE INVENTION

Figure 1:
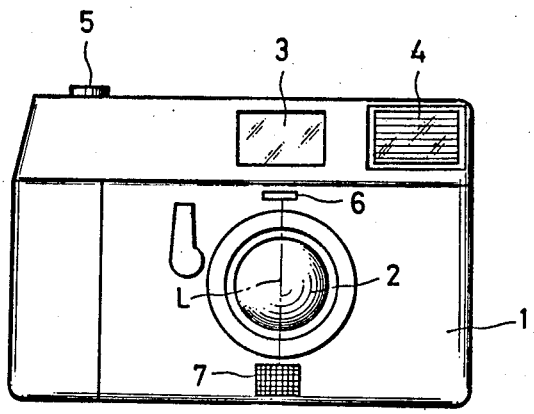
FIG. 1 is a front view of a camera embodying the present invention.

Referring to FIG. 1, there is shown therein a compact camera embodying the present invention which has a camera housing 1 provided with a taking lens 2 at substantially the center of the front wall of the housing, a view-finder window 3 and a flash light projection window 4, both of which windows are disposed in an upper section thereof, and a shutter release member 5 at the top thereof. Above the taking lens 2 is means 6 for projecting a line of illumination light in the forward direction. Opposite the light projection means 6 with respect to the taking lens 2 is means 7 located at a distance equal to the predetermined base length L of the range finding apparatus from the light projection means 6 for receiving light reflected from a subject. By these means the automatic range finding apparatus is comprised and is described in detail in association with FIG. 2.

Figure 2:
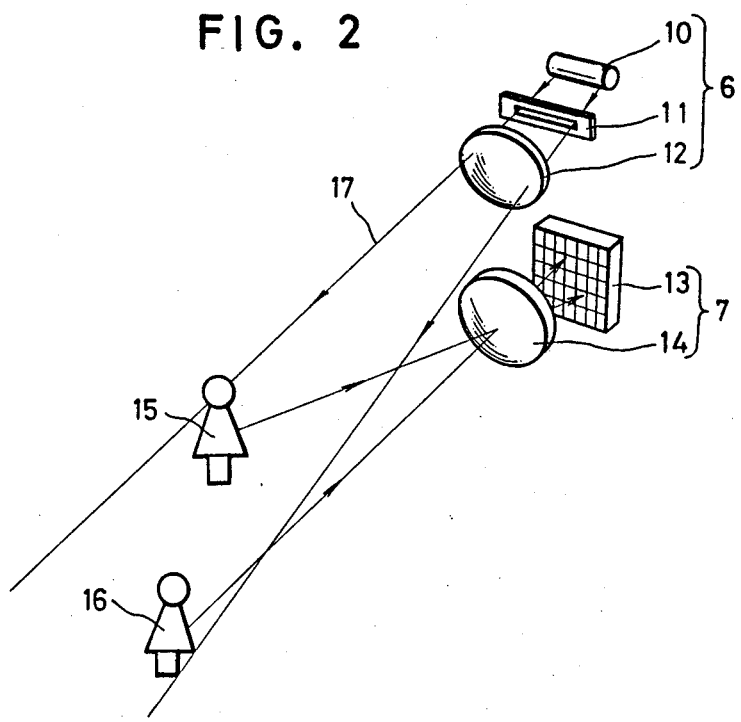
FIG. 2 is an explanatory schematic view illustrating a target-free range finding apparatus of the present invention.

Referring to FIG. 2, the light projection means 6 comprises a rod-shaped flash lamp 10 for emitting near-infrared light, a plate 11 having an elongated transverse opening which defines a thin slit, and a projection lens 12 for directing the near-infrared light in the form of a line of illumination in the forward direction and illuminating a subject or subjects in the field. The flash lamp 10 and the slit plate 11 are placed parallel to the focal plane of the camera lens 2 and disposed within the camera housing 1. On the other hand, light-receiving means 7 comprises a light sensor 13 for detecting near-infrared light and a lens 14 for focussing near-infrared light reflected from the subjects on the light sensor 13. The light sensor 13 is an image sensor, such as CCDs or a charge storage type of MOS image area sensor, comprising a large number of photoelectric conversion elements (which are referred to ax pixels) arranged in lines and columns, each pixel column of which is parallel to the base length L of the range finding apparatus of the camera, and each pixel line of which is parallel to the rod-shaped flash lamp 10 and the slit of the slit plate 11 and hence parallel to the line of illumination light.

Figure 3A:
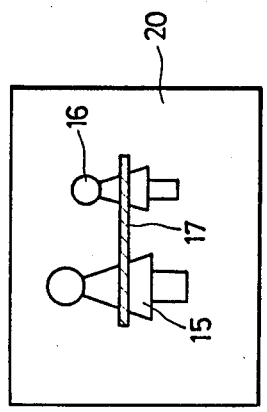
FIGS. 3(A) and (B) are views of a field of view showing an area to be distance-measured and an area to receive light, respectively.

Upon depressing the shutter release member 5, the flash lamp 10 emits illumination light for a predetermined period of time immediately before the shutter operates. The illumination light emitted in the form of a line from the flash lamp 10 passes through the slit plate 11 and passes through the lens 12 toward the subjects 15 and 16. This line of illumination light 17, as shown in FIG. 3(A), extends transversely of the image area 20 and has a transverse length as long as approximately one third of the diagonal of the image area 20. Accordingly, subjects existing in a wide area of photographic field can be detected for subject distance determination.

Figure 3B:
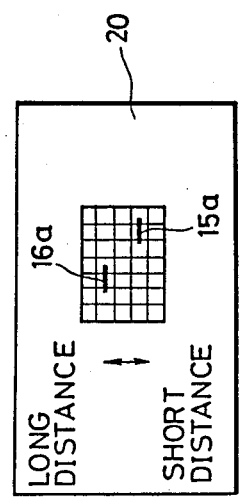

The light reflected from the subjects 15 and 16 is divided into two parts and focussed on the light sensor 13, but on different pixels according to the distances at which the subjects 15 and 16 stand. Specifically, as shown in FIG. 3(B), the part of the light reflected from the subject 15 standing nearer to the camera than the subject 16 is focussed on a pixel 15a in the second-from-lowest pixel line and is converted electrically thereby. On the other hand, the other part of the light reflected from the subject 16 standing farther from the camera than the subject 15 is focussed on a pixel 16a in the fourth-from-lowest pixel line and is converted electrically thereby.

Figure 4:
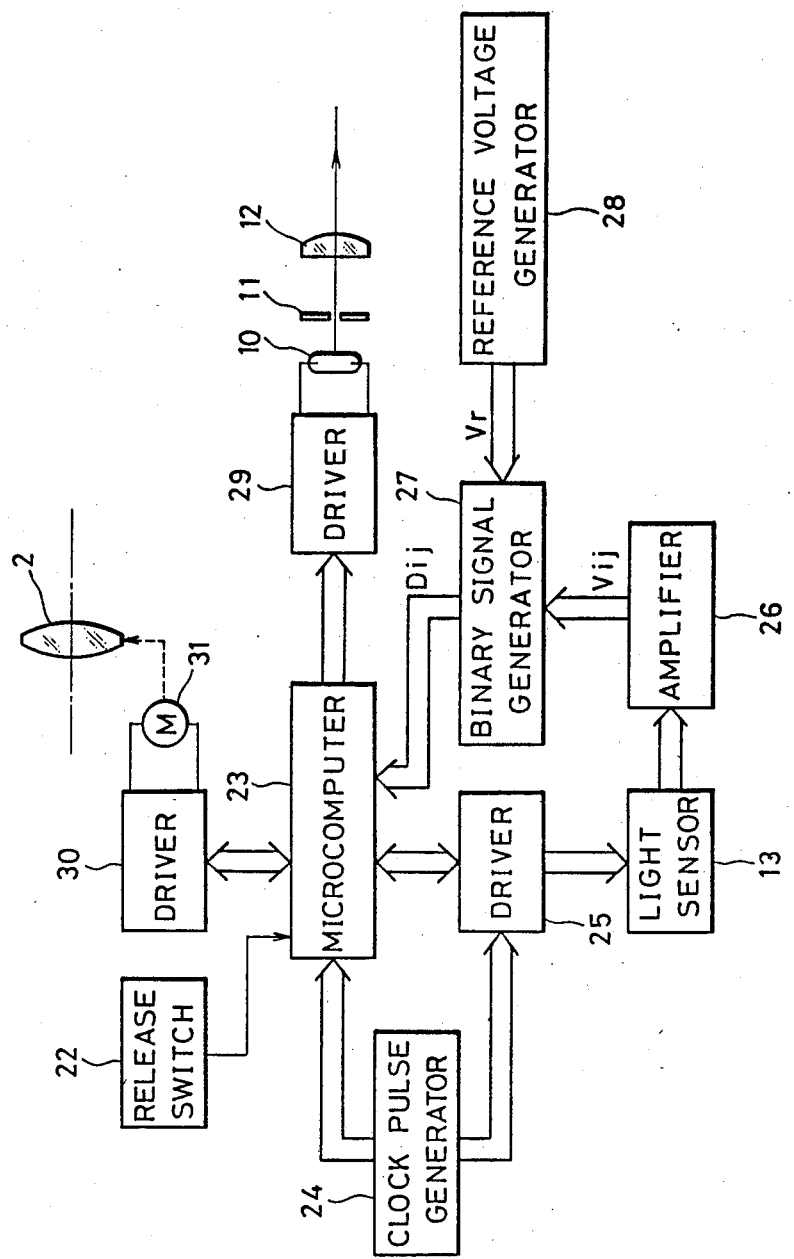
FIG. 4 is a block diagram showing the range finding apparatus of an embodiment according to the present invention.

The automatic range finding apparatus of this invention is embodied by a circuit shown in FIG. 4. Upon a half-depression of the shutter release member 5, a release switch 22 is turned on to provide a microcomputer 23 with a detection start signal. The microcomputer 23 executes a sequential control by a clock pulse generated from a clock pulse generator 24. The clock pulse is also supplied to a driver 25 which drives the light sensor 13.

Figure 5:
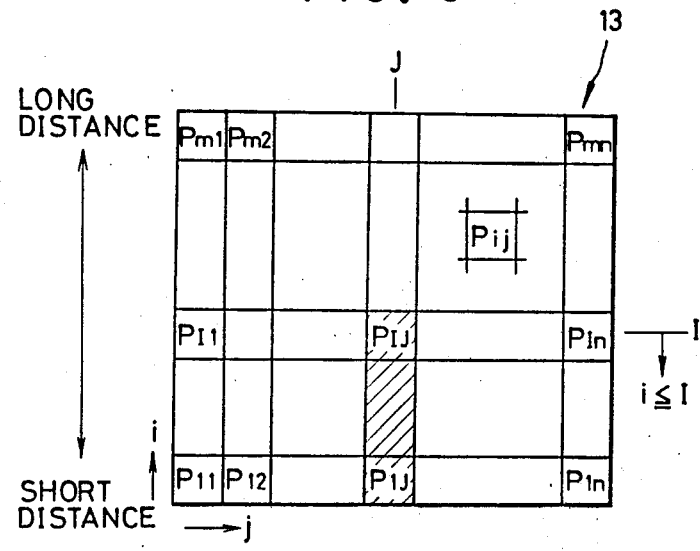
FIG. 5 is a schematic illustration of an example of a light-receiving device.

The light sensor 13 comprises a large number of pixels, P11 through Pmn, arranged in m lines and n columns (wherein m and n are positive integers) as is shown in FIG. 5. In FIG. 5, for example, the pixel in the i-th line from the bottom and the j-th column from the left is designated Pij. If any one of the pixels in the lowest of first line (i=1), P11 through P1n, receives light reflected from a subject, the subject is determined to be located at the shortest distance from the camera. If any one of the pixels in the m-th line (i=m), Pm1 through Pmn, receives light reflected from a subject, the subject is determined to be located at the longest distance from the camera. Furthermore, if any one of the pixels in the first line through the I-the line (which comprise the short distance pixel range) receives light reflected from a subject, the subject is determined to be located within the short distance range of the photographic field, for example at a distance less than four meters. On the other hand, within the short distance pixel range, pixels in the J-th column shaded in FIG. 5 which are located along the vertical center line of the image area 20 comprise the short distance central pixel range.

If a single line of pixels of the sensor 13 receives light reflected form a subject, the focus of the camera lens 2 is adjusted to a subject distance corresponding to the single pixel line. However, if a plurality of lines of pixels of the light sensor 13 receives reflected light, for example any one of the pixels of the short distance center pixel range and any one of pixels of the outer pixel range (which comprises all the pixels other than the pixels in the short distance center pixel range), the focus of the camera lens 2 is adjusted to a subject distance corresponding to a pixel line within the short distance pixel range, in preference to a pixel line of the outer pixel range, even though the latter pixel line may be located lower than the former pixel line. If at least two portions of the reflected light are focussed on a plurality of pixels in the same pixel range at different locations, the focus of the camera lens 2 is adjusted to the lower pixel line including any of that plurality of pixels.

The short distance center pixel range may be comprised by two or more lines of pixels.

The light sensor 13 is driven by clock pulses from the driver 25 to provide outputs from the respective pixels by pixel line in order: namely, from the lowest or first pixel line (i=1) to the m-th pixel line (i=m). In the same pixel line, the pixels are read in order, namely from the first pixel column (j=1) to the n-th pixel column (j=n). The output Vij from each pixel Pij is sent to an amplifier 26 for amplification. The amplified output Vij is then sent to a binary signal generator 27 which generates a binary signal Dij, logic "1" or logic "0", according to the value of the output Vij. Specifically, the binary signal generator 27 compares the value of the output Vij with a reference voltage Vr thereby to generate the binary signal Dij of logic "1", if the value of the output Vij is larger than the reference voltage Vr; and the binary signal Dij of logic "0", if the value of the output Vij is smaller than the reference voltage Vr.

Figure 6:
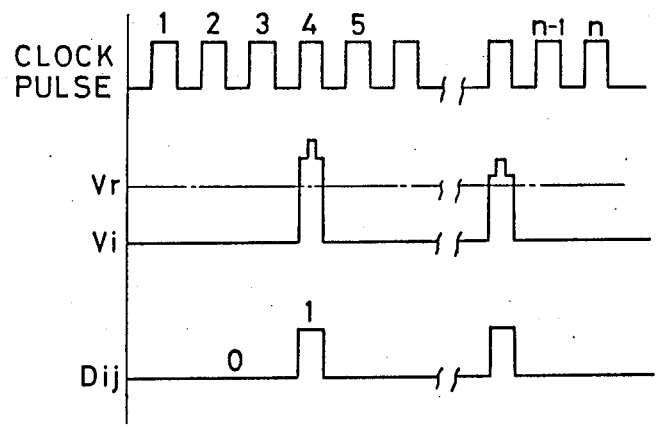
FIG. 6 is a diagram showing waveforms illustrating the operation of the binary signal generator.

As is shown in FIG. 6, the signals from the respective pixels P11 through Pmn are converted by the binary signal generator 27 into the binary signals Dij after amplification by the amplifier 26 and written in the RAM of the microcomputer 23 at corresponding addresses. According to the binary signals, the subject distance is determined in a manner which will be described later and the camera lens 2 is focussed on a subject standing at the determined subject distance. This camera lens adjustment is directed by the microcomputer 23. The microcomputer 23 drives a motor 31 and controls the direction and amount of rotation of the motor 31 through a drive 30 and also actuates the flash lamp 10 through a driver 29.

Figure 7:
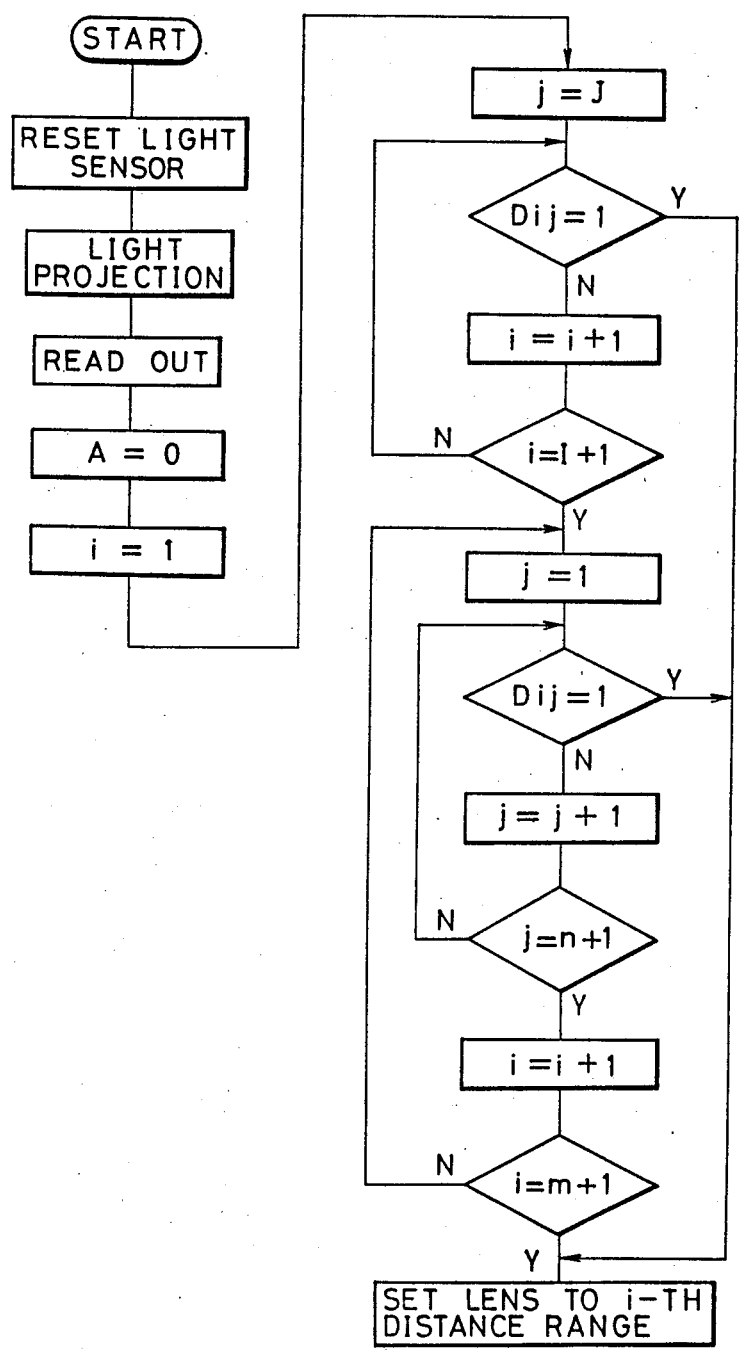
FIG. 7 is a flow chart showing the operation of the range finding apparatus of FIG. 4.

The operation of the apparatus of FIG. 4 is executed according to a flow chart shown in FIG. 7. Upon depressing halfway the release button 5, the microcomputer 23 provides an initial reset signal to the driver 25 so as to read out quickly charges previously stored in the respective pixels, P11 through Pmn, of the light sensor 13, thereby resetting the light sensor 13 to its initial condition. Then the microcomputer 23 drives the driver 29 so as to cause the flash lamp 10 to emit light either continuously or intermittently for a predetermined period of time, projecting a line illumination light toward a subject or subjects. Light reflected from the subject or subjects is focussed by the lens 14 on pixels at different locations according to the distance at which the subjects are located.

The pixels P11 through Pmn of the light sensor 13 are read in order by means of the driver 25 to provide outputs which are amplified by the amplifier 26 and converted into binary signals Dij, logic "0" or logic "1".

The binary signals Dij are stored in the RAM at the corresponding addresses.

The microcomputer 23 reads the pixels of the short distance center pixel range, from the first to the I-th pixel line, and judges the read out binary signals Dij in the read out order to detect one which is logic "1". The microcomputer 23, at the moment a binary signal Dij of logic "1" is first detected, terminates the detection and controls the motor 31 to rotate according to a pixel line of the pixel which is first detected to have the binary signal of logic "1", thereby adjusting the focus of the camera lens 2 to a subject distance corresponding to the i-th distance range.

If no incident light falls on any of the pixels in the short distance center pixel range, no binary signal Dij of logic "1" is detected in the short distance center pixel range; instead, all the binary signals Dij are logic "0". Consequently, the microcomputer 23 restarts the detection for pixels in the outer pixel range in order from the pixel P11 in the first line, the first column to the pixel P1n in the first line, the last column, to detect a pixel having the binary signal of logic "1". In the same manner, the microcomputer 23 repeats the detection for all pixel lines until a pixel having the binary signal of logic "1" is detected. The microcomputer 23, when detecting a pixel Pij having the binary signal Dij of logic "1", controls the motor 31 to rotate so as to adjust the focus of the camera lens 2 to a subject distance corresponding to the i-th distance range.

As will be apparent from the above, when a single portion of reflected light is focussed on the short distance center pixel range, the subject distance is determined according to a pixel line to which belongs a pixel receiving that signal portion of reflected light. However, when two portions of reflected light are focussed on the short distance center pixel range, the subject distance is determined according to a lower of the two pixel lines to which belong the pixels receiving the two portions of reflected light. If in fact there are two portions of incident light focussed on the light sensor 13, one on the short distance center pixel range and one on the outer pixel range, the subject distance is determined according to a pixel line of the short distance center pixel range even though a pixel line of the outer pixel range is lower than the pixel line of the short distance center pixel range. On the other hand, if a plurality of portions of incident light are focussed all on the outer pixel range, the lowest one of the pixel lines containing pixels receiving the portions of the incident light is given priority over the others for the determination of subject distance. It will be self-evident from the above that when the binary signal Dij is logic "0" for all the pixels in the first line through the m-th line, the camera lens 2 is adjusted to infinity.

Figure 8:
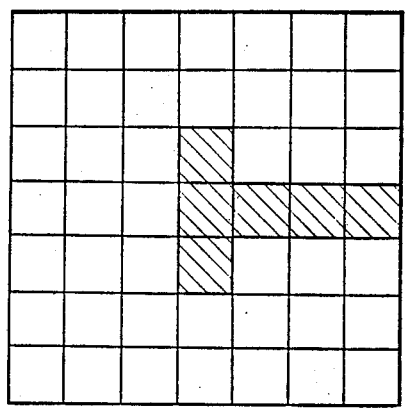
FIG. 8 is a schematic view of another example of a light-receiving device.

Although, in the above-described embodiment, the short distance center pixel range is comprised by pixels in the single center column, it is possible to constitute the short distance center pixel range not only by pixels in the single center column, but also by pixels in the columns on both sides of the single center column, as is shown in FIG. 8. In this case, there are a plurality of binary signals of logic "1" from pixels in the n-th column and the (n+1)-th column, and lower lines are given priority over the other lines for a determination of subject distance.

The light projection means 6 and the light detection means 7 are not required to be arranged vertically as long as the base length L is maintained and the pixel lines of the light sensor 13 are parallel to the line of illumination light and the pixel columns of the light sensor 13 are perpendicular to the base length L. Furthermore, two sets of the light projection means 6 may be provided in such a way as to emit two lines of illumination light crossing each other at a right angle.

Although the present invention has been described by way of preferred embodiment thereof with reference to the accompanying drawings, it is to be noted that various changes and modifications will be apparent to those skilled in the art. Therefore, unless otherwise such changes and modifications depart from the true scope of the present invention, they should be construed as being included therein.

What is claimed is:

1. In an automatic range finding method which comprises projecting a line of light toward a scene including a subject to be photographed; receiving light reflected from the subject by a light sensor having a plurality of photoelectric conversion pixels arranged in m lines and n column, m and n being positive integers, the first line of said plurality of photoelectric conversion pixels receiving light reflected from a subject at a shortest subject distance and the m-th line of said plurality of photoelectric conversion pixels receiving light reflected from a subject at a greatest subject distance; and determining the distance of the subject to be photographed according to a pixel line which contains a pixel receiving said reflected light; the improvement comprising detecting which photoelectric conversion pixels receive said reflected light;

determining said subject distance according to, when a part of said reflected light is received by a short distance center pixel range which is defined by pixels arranged between the first to the I-th pixel lines, I being less than m, in at least one pixel column including the middle pixel column, a pixel line contains one of said detected photoelectric conversion pixels within said short distance center pixel range in preference to other pixel lines each of which contains any one of said detected photoelectric conversion pixels, or according to, when no part of said reflected light is received by said short distance center pixel range, a pixel line which contains one of said detected photoelectric conversion pixels nearest to said first pixel line; and providing a signal representative of said determined subject distance by which the focus of a camera lens is adjusted.

2. A method as defined in claim 1, wherein, when at least two photoelectric conversion pixels receiving said reflected light are detected in said short distance center pixel range, said subject distance determination is made according to a pixel line which contains one of said at least two photoelectric conversion pixels nearer to said first pixel line than the other.

3. A method as defined in claim 1, wherein said line of light is projected by a light projector comprising a flash lamp, a slit plate having an elongated opening by which a thin slit is defined therein, and a projection lens for directing light passing through said slit plate in the forward direction.

4. An automatic range finding apparatus comprising:
means for projecting a line of light toward a scene including a subject to be photographed;
means for receiving light reflected from the subject, said light receiving means having a plurality of photoelectric conversion pixels arranged in m lines and n columns, m and n being positive integers, the first line of said plurality of photoelectric conversion pixels receiving light reflected from a subject at a shortest subject distance and the m-th line of said plurality of photoelectric conversion pixels receiving light reflected from a subject at a longest subject distance;
means for detecting which photoelectric conversion pixels receive said reflected light;
means for determining a subject distance according to, when a part of said reflected light is received by a short distance center pixel range which is defined by pixels arranged between said first to the I-th pixel lines, I being less than m, in at least one pixel column including the middle pixel column, a pixel line which contains one of said detected photoelectric conversion pixels within said short distance center pixel range in preference to other pixel lines each of which contains any one of said detected photoelectric conversion pixels, or according to, when no part of said reflected light is received by said short distance center pixel range, a pixel line which contains one of said photoelectric conversion pixels nearest to said first pixel line; and means for providing a signal representative to said determined subject distance by which the focus of a camera lens is adjusted.

5. An apparatus as defined by claim 4, wherein said subject distance determining means determines a subject distance according to, when at least two photoelectric conversion pixels receiving said reflected light are detected in said short distance center pixel range, a pixel line which contains one of said at least two photoelectric conversion pixels nearer to said first pixel line than the other.

* * * * *